United States Patent
Prater et al.

(10) Patent No.: US 7,032,729 B2
(45) Date of Patent: Apr. 25, 2006

(54) TORQUE CONVERTER

(75) Inventors: Ronald E. Prater, Rochester, MI (US); Joseph A. Szuba, Dearborn, MI (US)

(73) Assignee: RonJo Co., Rochester, MI (US)

( * ) Notice: Subject to any disclaimer, the term of this patent is extended or adjusted under 35 U.S.C. 154(b) by 57 days.

(21) Appl. No.: 10/731,245

(22) Filed: Dec. 9, 2003

(65) Prior Publication Data

US 2004/0112699 A1     Jun. 17, 2004

Related U.S. Application Data

(60) Provisional application No. 60/432,350, filed on Dec. 10, 2002.

(51) Int. Cl.
*F16H 45/02* (2006.01)

(52) U.S. Cl. .................... 192/3.28; 192/112; 60/366

(58) Field of Classification Search ................ 192/112; 60/366, 367; 29/889.5
See application file for complete search history.

(56) References Cited

U.S. PATENT DOCUMENTS

| | | | |
|---|---|---|---|
| 2,745,354 A * | 5/1956 | English et al. ............ 416/180 |
| 2,903,910 A * | 9/1959 | Carnegie .................... 477/64 |
| 3,250,222 A * | 5/1966 | Zeidler ...................... 220/681 |
| 4,138,003 A | 2/1979 | Malloy |
| 4,502,279 A | 3/1985 | Fuehrer |
| 5,293,978 A | 3/1994 | Reik et al. |
| 5,384,958 A | 1/1995 | O'Daniel et al. |
| 5,566,801 A | 10/1996 | Fukunaga et al. |
| 5,893,704 A | 4/1999 | Prater |
| 6,003,648 A | 12/1999 | Sudau |
| 6,085,879 A | 7/2000 | Ebinger et al. |
| 6,289,674 B1 | 9/2001 | Halene et al. |
| 6,321,891 B1 | 11/2001 | Olsen et al. |
| 6,343,679 B1 | 2/2002 | Kundermann |
| 6,364,777 B1 | 4/2002 | Kundermann |
| 6,367,605 B1 | 4/2002 | Middelmann et al. |

FOREIGN PATENT DOCUMENTS

| | | |
|---|---|---|
| DE | 3410526 A1 | 10/1985 |
| DE | 198 10 297 A1 | 9/1999 |
| DE | 10019228 | 1/2001 |
| EP | 0 533 426 A2 | 3/1993 |
| EP | 0 997 666 A2 | 5/2000 |

(Continued)

OTHER PUBLICATIONS

PCT International Search Rep., May 13, 2004.

*Primary Examiner*—Richard M. Lorence
(74) *Attorney, Agent, or Firm*—Carlson, Gaskey & Olds (57) ABSTRACT

A torque converter housing includes an end cover that is secured to an impeller outer wall in a unique manner. The outward portions of the end cover extend in a radial direction but not in an axial direction. The end cover preferably does not extend axially beyond a plane of a clutch supported within the assembly. The impeller outer wall extends axially beyond the plane where it is secured to the end cover. The inventive arrangement changes the location of the connection between the impeller outer wall and the end cover, which enables the use of various other optional and advantageous features of the inventive arrangement. In one example, the impeller outer wall is welded to the end cover. In another example, a threaded connection secures the impeller outer wall to the end cover.

11 Claims, 8 Drawing Sheets

FOREIGN PATENT DOCUMENTS

| | | |
|---|---|---|
| GB | 730857 | 9/1951 |
| GB | 785924 | 9/1955 |
| JP | 5-87190 | 4/1993 |
| JP | 05087190 | 4/1993 |
| JP | 8285038 | 11/1996 |
| JP | 10068456 | 3/1998 |
| JP | 2000230626 | 8/2000 |
| WO | WO 01/11267 A1 | 2/2001 |

* cited by examiner

TORQUE CONVERTER

CROSS REFERENCE

This application claims priority to U.S. Provisional Application No. 60/432,350, filed Dec. 10, 2002.

BACKGROUND OF THE INVENTION

This invention generally relates to torque converters. More particularly, this invention relates to unique connection arrangements for securing components associated with a torque converter assembly.

Torque converters are well known. They typically include a turbine portion, an impeller portion and a clutch within a housing. An end cover typically is secured to an outer wall of the impeller portion close to the turbine portion. Conventional connection techniques include welding the end cover, which has an axially extending portion that is received against the impeller outer wall. Example patents showing such an arrangement include U.S. Pat. Nos. 6,003,648 and 5,566,801.

While conventional arrangements provide a secure connection, they are not without shortcomings and drawbacks. For example, the welding operation typically results in flash, spatter or a weld crown on the outer periphery of the housing that compromises the clearance between the torque converter housing and the surrounding transmission bell housing. There often is additional weld spatter on the inside of the housing, which may eventually come loose and cause problems. Additionally, the connection between the cover and the impeller housing typically interferes with the fluid flow in the turbine portion of the torque converter.

The end cover in some conventional arrangements balloons in the center area near the pilot nose responsive to pressure within the torque converter housing. Such deformation tends to exert pressure against the engine crankshaft bearing, which introduces the possibility for needed maintenance or repair. Additionally, conventional cover designs require expensive manufacturing processes.

This invention provides an improved torque converter assembly that avoids the shortcomings and drawbacks of the prior art.

SUMMARY OF THE INVENTION

In general terms, this invention is a torque converter assembly having an impeller outer wall that is secured to an end cover in a unique manner.

In one assembly designed according to this invention, a clutch portion is supported within the assembly near an end cover, which is at a first axial end of the assembly. The end cover does not extend beyond a plane of the clutch. A turbine portion is supported within the assembly on an opposite side of the clutch from the end cover. An impeller portion has an outer wall that begins at a second axial end of the assembly and extends beyond the plane of the clutch, where an end portion of the outer wall is secured to the end cover.

Eliminating the previously used weld at the equator of the torque converter housing not only improves the clearances and performance of the torque converter but also improves the torque converter assembly balance.

In one example arrangement, the impeller outer wall is welded to the end cover. In another example arrangement, the impeller outer wall and the end cover include corresponding threaded portions that cooperate to secure the outer wall to the end cover.

In one example, the end cover is modified so that it includes the gear surfaces that are typically included on a flywheel flex plate. Such design alternatives are made possible by the inventive arrangement, which introduces greater design flexibility and other economies associated with an assembly designed according to this invention.

In another example embodiment, the end cover extends radially outward beyond the turbine portion. The radially extending portion provides a convenient mounting surface for securing a flywheel flex plate in place.

One advantage of the disclosed embodiments is that they allow for using a thicker cover plate, which adds strength where it is most needed. The inventive arrangement makes this possible, in part because the cover plate need not be formed in a complex manner like that required with a conventional torque converter design. A thicker cover plate is one way in which this invention avoids the ballooning effect described above.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
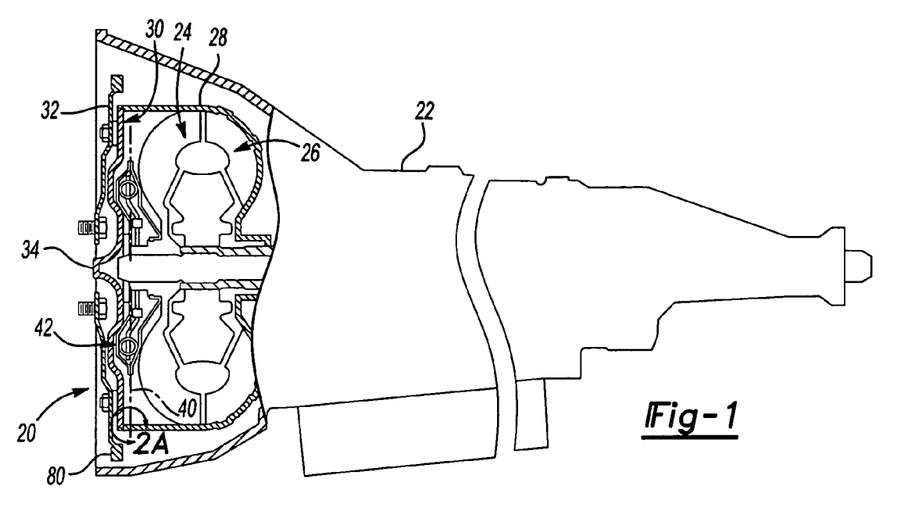
FIG. 1 schematically illustrates a torque converter housing designed according to this invention.

FIG. 1 schematically illustrates a torque converter assembly 20 within a transmission bell housing 22. The torque converter assembly 20 includes a turbine portion 24 and an impeller portion 26. An outer wall 28 of the impeller portion 26 is secured to an end cover 30 which, in this example is associated with a flywheel flex plate 32 in a manner understood in the art.

The end cover 30 is generally plate-like although it is not necessarily planar across the entire surface of the end cover 30. For example, a nose pilot 34 of the illustrated end cover 30 extends in an axial direction compared to other portions of the end cover 30. In this example, the nose pilot 34 is formed as a portion of the end cover 30 during the forming process. As described below, another example embodiment of this invention includes a nose pilot that is a separate piece from the cover secured to the end cover 30. The nose pilot portion operates in a conventional manner for cooperating with a crankshaft of an engine (e.g., locating the two pieces during assembly of the drive line), for example.

The end cover 30 preferably does not extend axially beyond a plane 40 of a clutch 42 supported within the torque converter assembly 20. The outer wall 28 of the impeller portion preferably extends beyond the plane 40, where an end portion of the outer wall 28 is secured to a corresponding portion of the end cover 30.

Figure 2A:
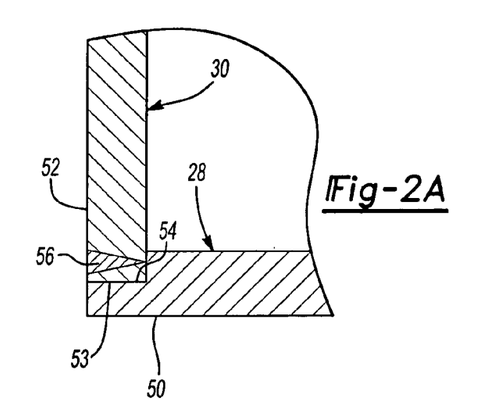
FIG. 2A is an enlarged view of the portion of the embodiment of FIG. 1 encircled at 2A.

Referring to FIG. 2A, one example connection arrangement designed according to this invention is shown where an end portion 50 of the outer wall 28 is secured to an outward portion 52 of the end cover 30. In this example, an end surface 53 of the end cover 30 is at least partially received in a stepped portion 54 of the end portion 50 of the outer wall 28. Once the end cover 30 and the outer wall 28 are appropriately positioned relative to each other, they are welded together using a laser weld 56. Of course, other welding techniques are within the scope of this example embodiment of this invention.

A significant advantage of this invention is that the connection between the outer wall 28 and the end cover 30 is not near the turbine portion 24 so that there is no interference with the fluid flow (i.e., turbulence caused by the prior art welds) within the torque converter assembly 20. Additionally, the radial space between the transmission bell housing and the outside of the impeller portion 28 is increased because there is no requirement for overlap between the cover and the impeller at the equator of the converter assembly. The inventive arrangement eliminates the weld joint at the equator as occurred in conventional arrangements. The possibility for causing interference between the outer surface of the torque converter assembly housing and the bell housing 22 is eliminated when utilizing the inventive arrangement and connection techniques. Accordingly, an improved torque converter-to-bell housing packaging is possible with this invention (the spacing shown in FIG. 1, for example, is exaggerated compared to what is possible).

The inventive assembly also allows for a more rigid corner radius where the outer wall 28 joins the end cover 30 because an increase in the wall thickness at that location (compared to conventional arrangements where the end cover is flow formed to include an axially extending portion) is possible with this invention. Moreover, the cover plate may be thicker than was previously practical because the relatively flat cover plate of the inventive arrangement does not require relatively complex flow forming techniques, which have been used to make conventional arrangements. The ability to use a thicker material for the cover plate in this invention minimizes or eliminates the previously experienced difficulties associated with undesirable ballooning of the torque converter housing near the pilot nose. Additionally, the outer impeller wall 28 can be made using thinner material, which introduces material and cost savings into an assembly designed according to this invention.

Figure 2B:
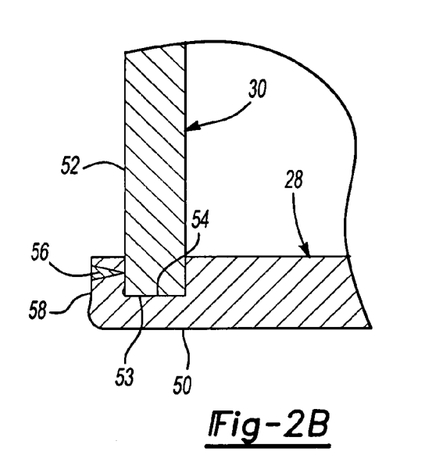
FIG. 2B schematically illustrates an alternative to the embodiment of FIG. 2A.

An alternative arrangement for securing the outer wall 28 to the end cover 30 is schematically illustrated in FIG. 2B. In this example, an extension 58 on the end portion 50 of the outer wall 28 is deformed around the end surface 53 on the outward portion 52 of the end cover 30. After the deformation of the extension 58, the extension is welded using a laser weld 56 to the end cover 30.

Figure 2C:
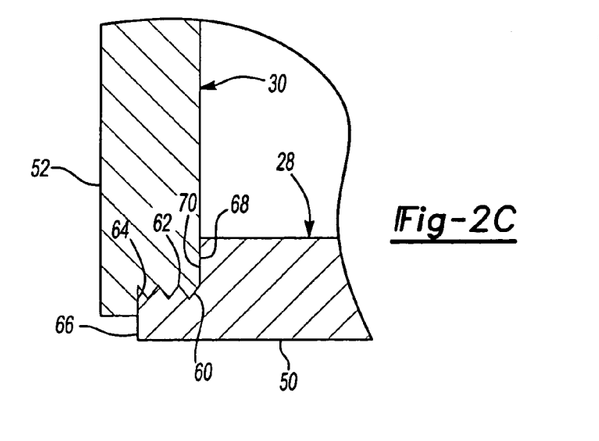
FIG. 2C schematically illustrates another alternative to the embodiment of FIG. 2A.

Another example embodiment is shown schematically in FIG. 2C. In this embodiment the outward portion 52 of the end cover 30 includes threads 60 that cooperate with threads 62 on the end portion 50 of the impeller outer wall 28. In the illustrated example, an extension 64 on the outward portion 52 sealingly abuts a cooperating surface 66 (in this example, the terminal surface) of the end portion 50. The threads 62 and 60 are timed so that an inner surface 68 on the outward portion 52 simultaneously abuts a stepped surface 70 on the end portion 50.

In the example of FIG. 2C, the end cover 30 is secured to the outer wall 28 using the threaded connection between the threads 60 and 62. The contact between the surfaces 64 and 66 on the one hand and the surfaces 68 and 70 on the other hand provide a seal to maintain fluid within the torque converter assembly housing and for preventing contaminants from entering the housing.

Figure 3A:
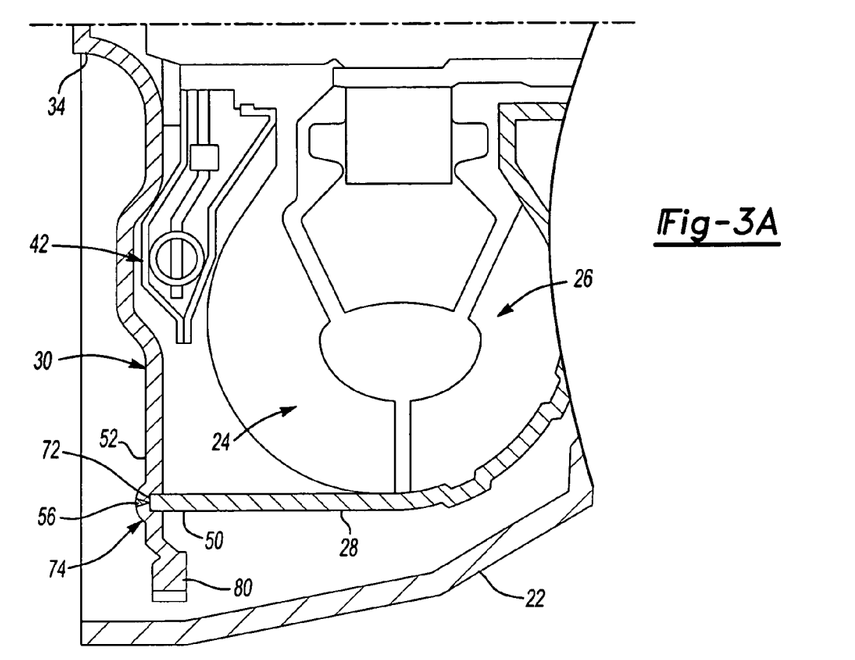
FIG. 3A schematically illustrates another example embodiment of a torque converter assembly designed according to this invention.

This invention provides the ability to modify the torque converter assembly and to selectively change surrounding components. For example, FIG. 3A schematically illustrates an embodiment where a terminal end 72 on the outer wall 28 is secured against a portion 74 of the end cover 30 that is formed about the end surface 72. In this example, the end cover 30 is also laser welded at 56 to the impeller outer wall 28.

The end cover 30 of this example is modified compared to those shown in the previous examples to include a gear surface 80 around the outer periphery of the end cover 30. Such gear surfaces typically are included on a flywheel flex plate, such as the flywheel flex plate 32 shown in the example of FIG. 1. With this invention, the end cover 30 can be modified to include the gear surface 80, which integrates the functions of more than one component from a conventional assembly, which introduces further material, cost and space savings.

Figure 3B:
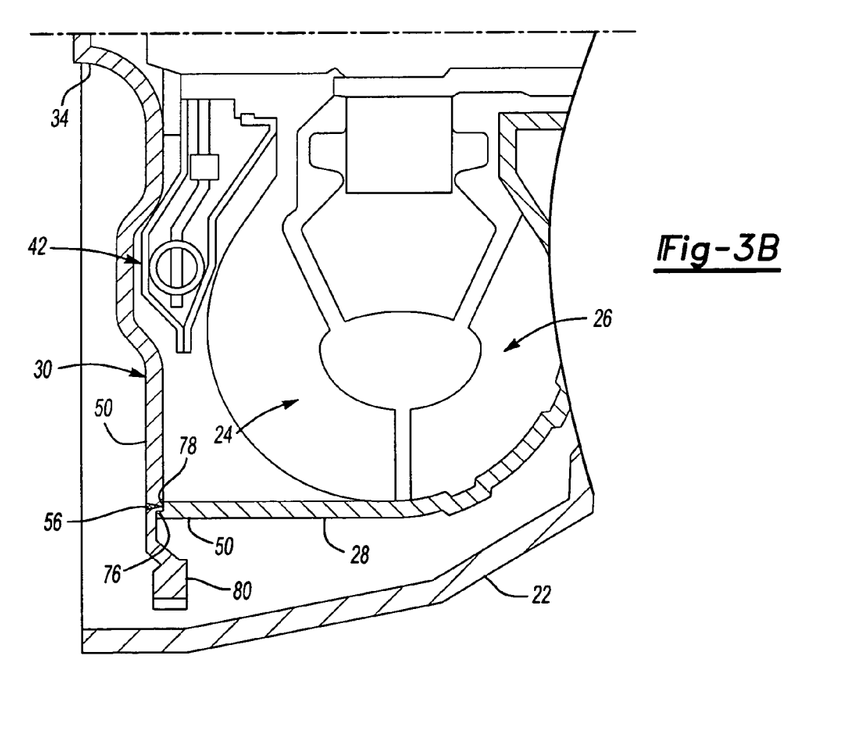
FIG. 3B schematically illustrates another example embodiment.

The example embodiment of FIG. 3B also includes a gear surface 80 on the outer periphery of the end cover 30. In this example, the end cover 30 includes a stepped portion 76 that cooperates with a stepped portion 78 of the impeller outer wall 28 for locating the end cover 30 relative to the impeller outer wall 28. A laser weld 56 secures the end cover 30 to the outer wall 28.

Figure 4:
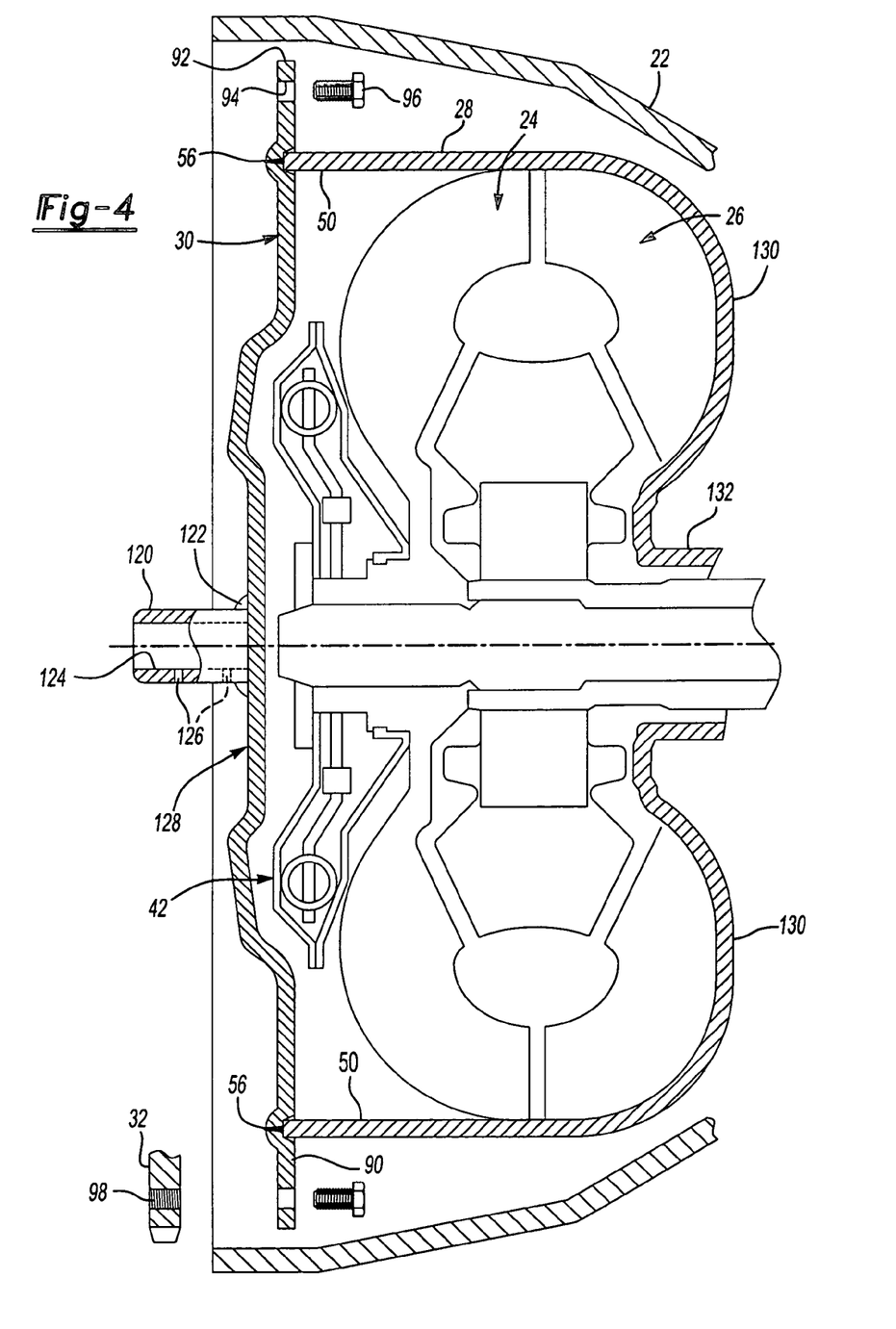
FIG. 4 schematically illustrates another example embodiment of a torque converter housing designed according to this invention.

Another example embodiment is shown in FIG. 4. One difference between this embodiment and those previously discussed is that the end cover 30 has a radially, outwardly extending flange 90. A distal edge 92 of the end cover 30 is spaced radially outward compared to the largest outside dimension of the impeller portion 28. The flange 90 allows for securing a flywheel flex plate 32 to the end cover 30 in a more convenient manner than that provided by conventional arrangements, which may be important for certain vehicle or engine configurations. In the example of FIG. 4, openings 94 are machined through the flange 90 of the end cover 30 to receive threaded fasteners 96 such as conventional bolts. The flywheel flex plate 32 includes threaded openings 98 formed in a conventional manner so that the flex plate can be secured to the cover according to the needs of a particular situation.

This embodiment allows for greater flexibility in assembling the driveline components when using a torque converter housing designed according to this invention. An embodiment designed according to this example includes the flywheel attachment location and surface outside of the envelope of the portion of the torque converter that establishes the housing.

Figure 5:
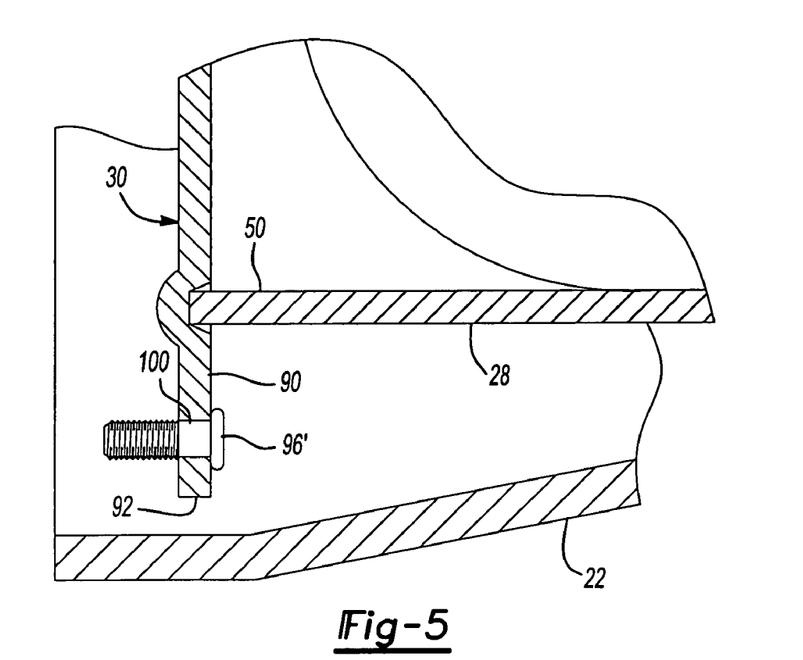
FIG. 5 schematically illustrates a selected portion of an embodiment like that shown in FIG. 4 with an alternative mounting member arrangement.

A modification of the embodiment of FIG. 4 is shown in FIG. 5. In this example, threaded fasteners 96' are welded at 100 to the end cover 30.

Figure 6:
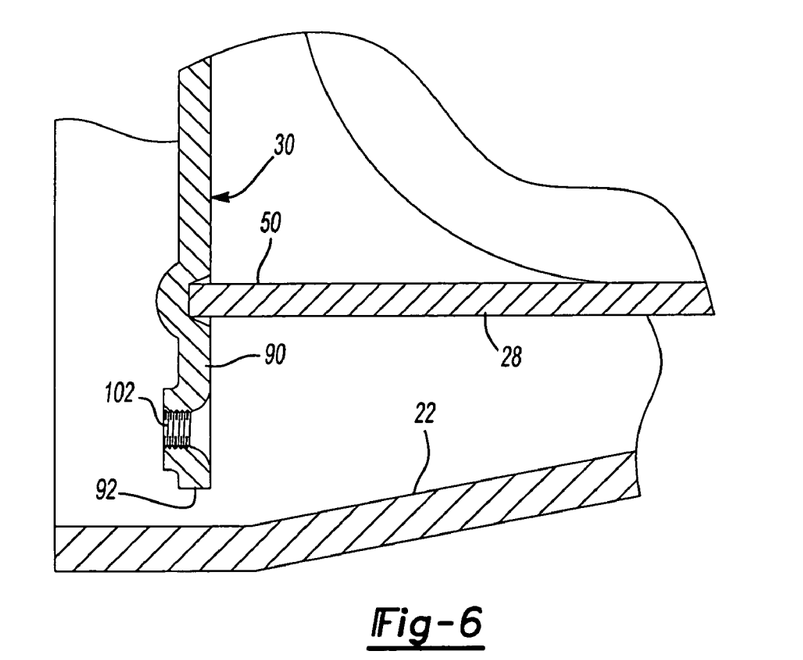
FIG. 6 schematically illustrates another example arrangement similar to that of FIG. 5.

Still another example is shown in FIG. 6 where the flange 90 of the end cover 30 includes threaded openings 102 for receiving a threaded member to make an appropriate attachment with a flywheel flex plate, for example.

Figure 7:
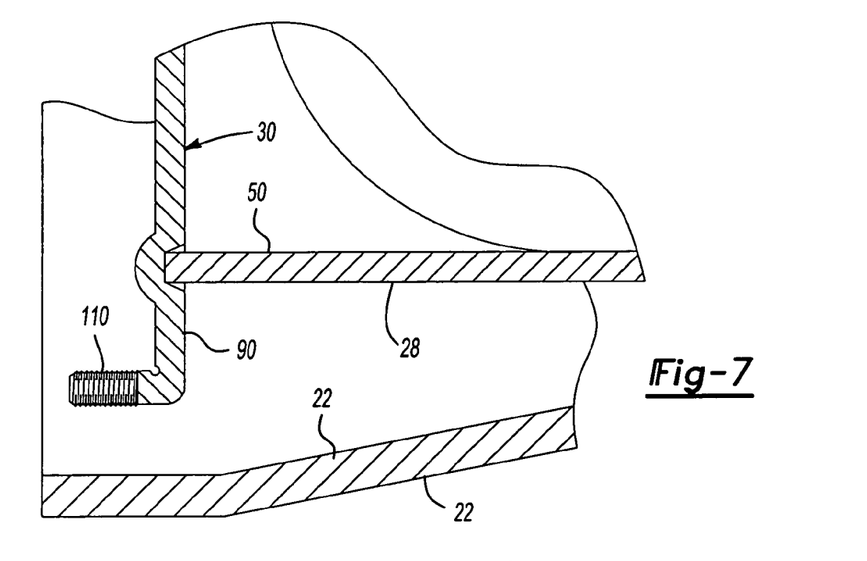
FIG. 7 schematically illustrates another example embodiment having an integrated flywheel mounting arrangement.

FIG. 7 illustrates another example embodiment where threaded members 110 are used to secure a flywheel flex plate, for example, in position relative to the converter housing. In this example, the threaded members 110 are integrally formed as part of the end cover 30. Such an arrangement has the advantage of eliminating additional pieces and streamlining the driveline assembly process. Although only one threaded member 110 is shown in the partial illustration of FIG. 7, there preferably are a plurality of such threaded members spaced about the periphery of the end cover.

Figure 8A:
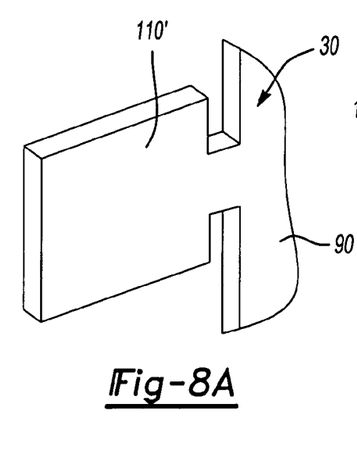
FIG. 8A schematically illustrates a selected portion of an end cover designed according to the embodiment of FIG. 7 at an early stage of making the end cover.
Figure 8B:
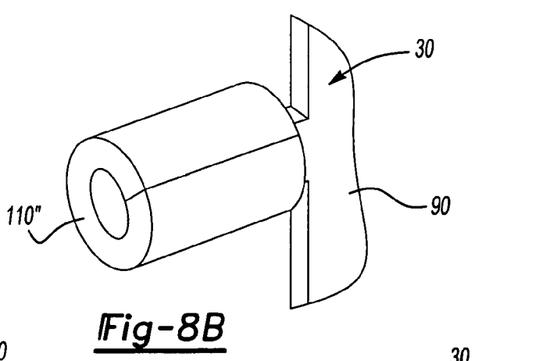
FIG. 8B schematically illustrates a later stage of the process compared to FIG. 8A.
Figure 8C:
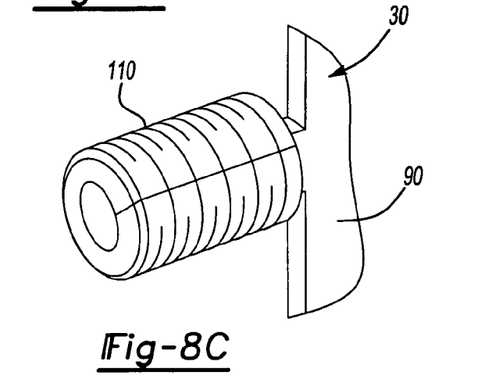
FIG. 8C illustrates a later step in the process compared to FIG. 8B.

FIGS. 8A through 8C schematically illustrate one method of making fasteners that are threaded members 110 that are integrally formed as part of the end cover 30. As shown in FIG. 8A, the end cover 30 is made using a conventional stamping process, for example. The outer edge of the end cover material includes a generally planar extension 110'. A substantial portion of the extension 110' is rolled or folded upon itself to establish a generally cylindrical part 110''. The cylindrical part in this example is subsequently machined to include threads on the outer periphery to establish a threaded member 110. In FIG. 8C, the threaded member 110 is still parallel to the plane of the end cover 30. A subsequent forming step moves the threaded member 110 into a generally perpendicular alignment with the main plane of the end cover 30. In one example, the material used to form the threaded member 110 is moved into the generally perpendicular orientation prior to the actual formation of the cylindrical body and the threads on the material used to establish the connector. Those skilled in the art who have the benefit of this description will realize how to manipulate appropriate amounts of material and to employ conventional forming techniques to make fasteners such as that shown in the example embodiment of FIG. 7.

Referring again to FIG. 4, some embodiments of this invention include a unique pilot arrangement. In the example of FIG. 4, the pilot 120 is not formed as part of the end cover 30 as is the pilot 34 in FIG. 1. In this example, the pilot 120 is a separate tubular piece that is welded at 122 to the end cover 30. The separate welded nose pilot provides the advantage of simplifying the design of the end cover 30. Without requiring complex forming processes to establish the pilot 120, the end cover 30 can be made from thicker material, which increases its strength and reduces the possibility for ballooning or deformation. The end cover 30 can be made using a relatively simple stamping operation. Using a welded pilot as shown in the illustrated example eliminates several stamping dies or stations and eliminates the need for a large machine press. Such an arrangement introduces various economies and cost savings compared to prior techniques. Additionally, reinforcing ribbing can be introduced to the design of the end cover 30 to further reduce the possibility of ballooning.

Another feature of the embodiment of FIG. 4 is that the pilot 120 includes an interior bore 124 that receives an appropriate portion of an engine crankshaft in a conventional manner. At least one vent opening 126 is provided to allow air to escape during the assembly of the engine crankshaft and the torque converter housing. In the illustration, a vent extends through the pilot tubing. In another example, a vent channel is formed in the end cover.

FIG. 4 shows another feature of an example embodiment of the cover 30. A central portion 128 has a generally concave contour as viewed from outside of the assembly (i.e., from the left in the illustration). The central portion 128 is under compression and resists outward deformation (i.e., toward the left in the drawing) that may otherwise be caused by pressure within the assembly.

Another feature of the example embodiment of FIG. 4 is that a flat ring 130 is formed at the crown of the impeller 28. The flat ring 130 provides an accurate locating surface for precise measurement and machining of the housing components.

The flat ring 130 allows for accurately locating the pilot 120 relative to a hub 132 so that precise coaxial alignment is achieved. In one example, the locating surface 130 is used for positioning the pilot 120 prior to welding the pilot to the end cover 30. In another example, the locating surface 130 is used to subsequently machine the pilot 120 to a desired size and location to achieve the desired alignment. The inventive arrangement allows for more accurately balancing the torque converter housing. This improves the so-called "NVH" and the concentricity of the cover pilot 120 to the impeller hub 132.

Additionally, the design of the impeller portion 28 allows for accurately gauging the end clearance by measuring a distance between a terminal edge of the impeller portion and the impeller thrust surface 134 opposite the ring 130. With the inventive arrangement, the precise location of the end cover 30 on the ends 50 of the impeller portion 28 allows for the end clearance to be premeasured using a mechanical gauge inside of the impeller portion. With the prior art design, such end clearance was never accurately measurable inside of the torque converter housing because of the nature of the components used to assemble the housing and the associated welding procedure. It was impossible to get a gauge to fit inside of the housing to make such a measurement.

Figures 9, 10:
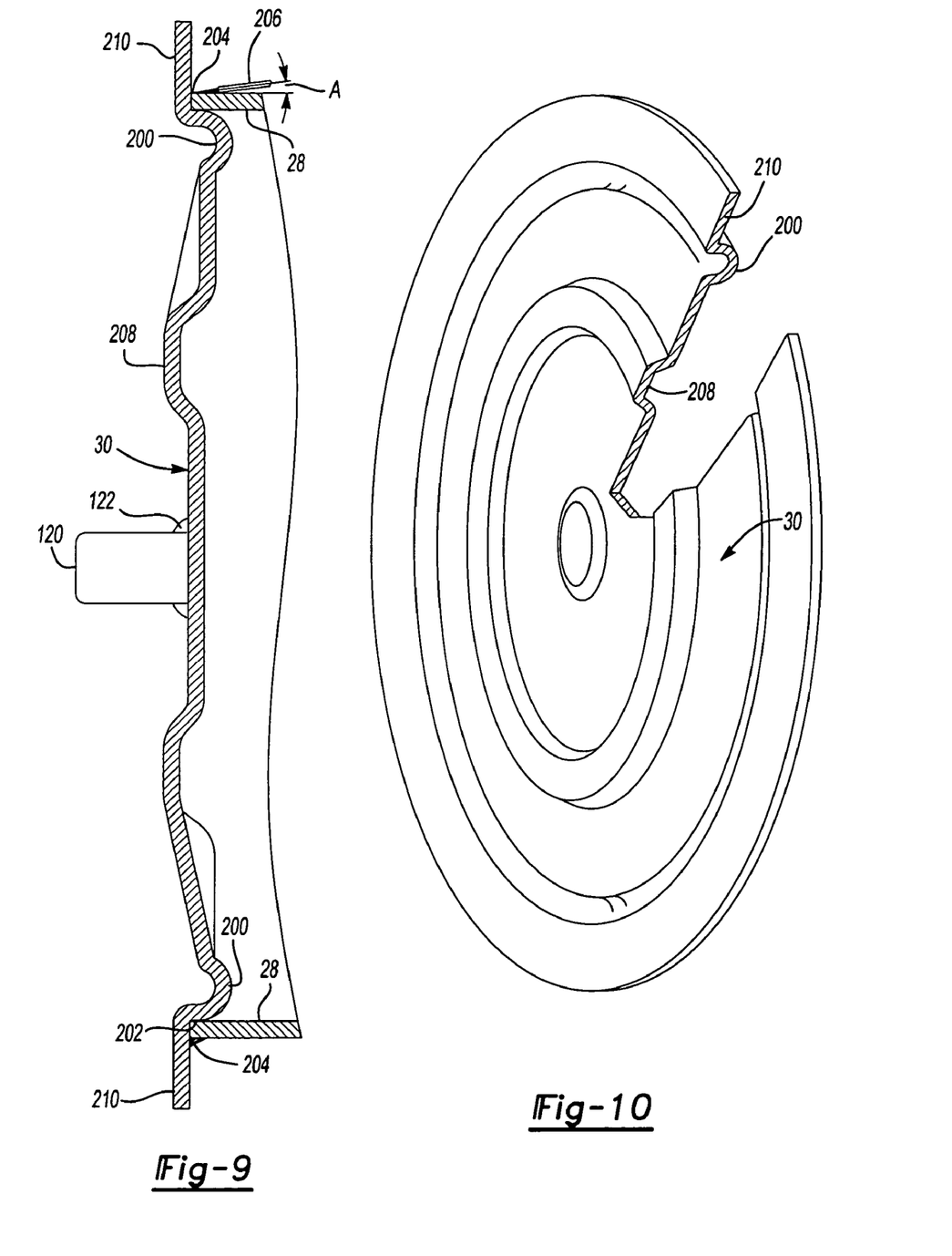
FIG. 9 is a cross-sectional illustration of another example embodiment of an end cover.
FIG. 10 is a perspective, partially cut-away, view of the embodiment shown in FIG. 9.

FIGS. 9 and 10 show another example embodiment of a cover 30. In this example, a reinforcing rib 200 is formed in the end cover 30 such that an outermost surface 202 on the rib is received against the outer wall 28 of the impeller housing 26. The ring-shaped rib 200 enhances the strength of the example end cover, in part, because it shortens the moment of the outward force that tends to cause ballooning of a cover in a torque converter. The inverted curvature of the rib 200 adds strength to the end cover 30, enhancing the service life of the torque converter assembly.

As best appreciated from FIG. 9, the impeller housing 26 outer wall 28 in this example is laser welded at 204 to the end cover 30. A conventional laser welding tool 206 establishes the laser weld 204 by being positioned at an angle A relative to the housing wall 28. In one example, the angle A equals 7°. A laser weld in this example is considered advantageous because the material of the end cover 30 and the outer wall 28 establish the weld 204 and no filler or other welding supplemental materials are required.

The example illustrated in FIGS. 9 and 10 includes another reinforcing ring 208 closer to a center of the cover 30 compared to the rib 200. This example also includes a flange 210 that extends outward beyond the outside of the outer wall 28. The flange 210 can be used for a variety of purposes, one such example use is described above and schematically shown in FIGS. 7 and 8A–8C. Another example use of such a flange is described below.

Figures 11, 12, 13:
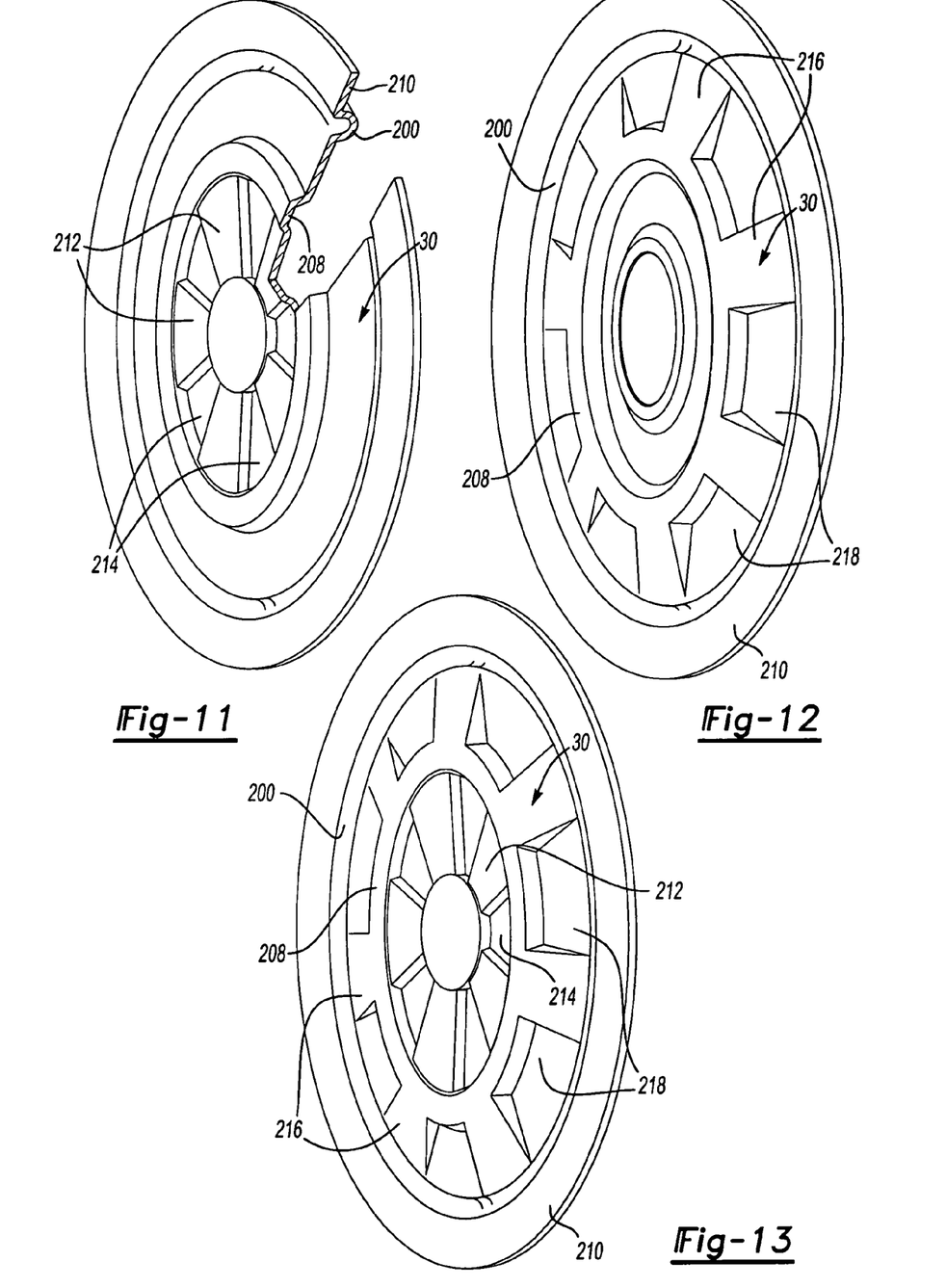
FIG. 11 illustrates another example embodiment of an end cover.
FIG. 12 illustrates another example end cover.
FIG. 13 illustrates another embodiment of an end cover.

Referring to FIG. 11, a modified version of the end cover 30 is shown compared to the version of FIGS. 9 and 10. In this example, reinforcing members 212 are inter-digitated with reinforcing members 214. In this example, the reinforcing members are surfaces aligned in different planes as can be appreciated from the drawing. The reinforcing members 212 and 214 substantially increase the stiffness of the end cover 30, which further resists any tendency for ballooning.

FIG. 12 illustrates another example where reinforcing members 216 and 218 extend between the inner ring 208 and the outer rib 200. FIG. 13 illustrates another example where the reinforcing members 212 and 214 are provided radially inward of the inner ring 208 and the reinforcing members 218 and 216 extend between the inner ring 208 and the outer rib 200. In each of the examples of FIGS. 11–13, each set of the reinforcing members extend across approximately 50% of the surface area of the corresponding portion of the end cover 30. For example, the reinforcing members 212 in the embodiment of FIG. 11 extend across 50% of the surface area of the portion of the cover 30 radially inward of the inner ring 208. Similarly, the reinforcing members 214 extend across approximately 50% of that surface area, although in a different plane as shown in the drawing.

Figures 14, 15:
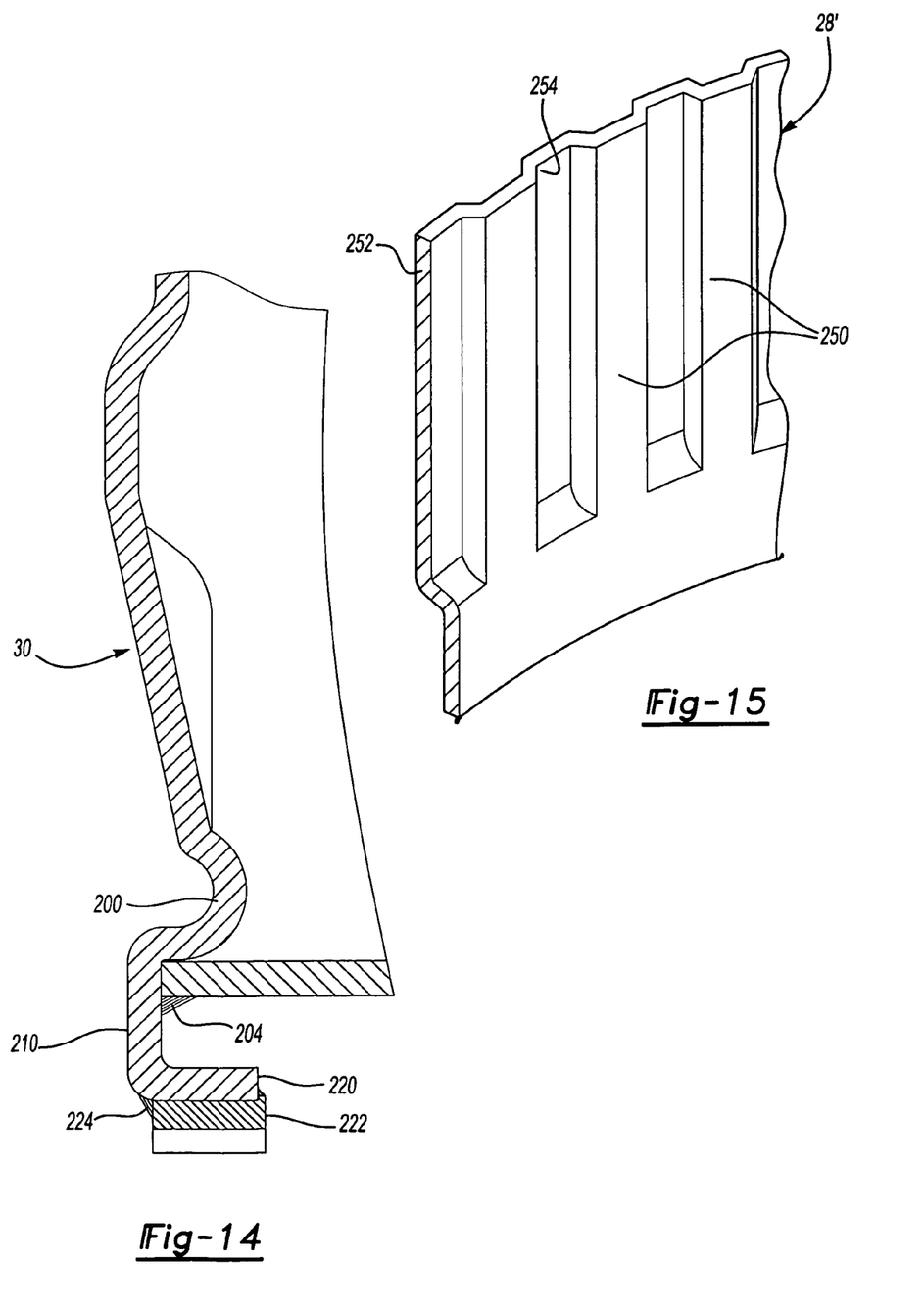
FIG. 14 is a cross-sectional illustration schematically illustrating a feature of another example embodiment.
FIG. 15 schematically illustrates another feature of another example embodiment of an impeller portion adapted to house a clutch.

FIG. 14 shows another example embodiment where the flange 210 includes a formed portion 220 that extends in a direction generally perpendicular to the overall plane of the end cover 30. In this example, a ring gear 222 is secured to the flange portion 220 using laser welds 224. This example shows another way of integrating components when using a torque converter assembly designed according to this invention.

FIG. 15 illustrates another example embodiment where the outer wall portion 28' of the housing 26 has been configured to accommodate a clutch for selectively coupling the output of an engine with a vehicle transmission. Traditionally, clutches have been maintained in separate housings. In this embodiment, the clutch can be incorporated into the torque converter assembly. As shown in FIG. 15, the outer wall 28' includes a plurality of splines 250 interspaced with a plurality of grooves 252. The splines 250 and grooves 252 are coordinated and sized to accommodate clutch plates that are designed in a generally known manner. As the torque converter housing 26 is larger than most clutch housings, the associated clutch plates will be of larger dimension, although they will have similar construction and function as traditional clutch plates.

In this example, the end 254 of the outer wall 28' is secured to the end cover 30 using one or more of the techniques described in connection with the examples given above. In one example, the end 254 is laser welded to the end cover 30 in a manner similar to that shown in FIG. 9.

The clutch plates accommodated by the splines 250 in one example are positioned between the end cover 30 and the torque converter clutch portion 42. Various known techniques can be used to secure the clutch plates in the desired position within the impeller housing 26 configured as shown in FIG. 15.

Various example embodiments of this invention have been disclosed. Variations and modifications to the disclosed examples may become apparent to those skilled in the art that do not necessarily depart from the essence of this invention. The scope of legal protection given to this invention can only be determined by studying the following claims.

We claim:

1. A torque converter assembly, comprising:
    a clutch portion;
    an end cover at a first axial end of the assembly that does not extend beyond a plane of the clutch;
    a turbine portion on an opposite side of the clutch from the end cover; and
    an impeller portion having an outer wall tat begins near a second axial end of the assembly and extends beyond the plane of the clutch, an end portion of the outer wall being secured to the end cover, wherein the end cover includes a radially extending portion near an outward edge of the end cover, the radially extending portion extending beyond an outside dimension of the impeller portion outer wall and providing a surface for connecting another driveline component to the end cover.

2. The assembly of claim 1, wherein the impeller outer wall is welded to the end cover.

3. The assembly of claim 1, wherein the end cover includes a strengthening ring that is received at least partially within the impeller portion adjacent the outer wall end portion.

4. The assembly of claim 1, wherein the radially extending portion supports a plurality of connecting members that facilitate fixedly connecting the end cover to the driveline component.

5. The assembly of claim 1, wherein the driveline component comprises a flywheel.

6. A torque converter housing, comprising:
    a generally plate-like end cover having an outward portion that extends in a radial direction but not in an axial direction; and
    an impeller outer wall having a portion that extends axially toward the end cover outward portion and is secured to the outward portion, wherein the end cover has a radially extending flange near an edge of the outward portion that extends beyond an outside dimension of the impeller outer wall and provides a surface for connecting another driveline component to the end cover.

7. The housing of claim 6, wherein the outer wall portion is welded to the end cover.

8. The housing of claim 6, including a separate pilot member that is welded to the end cover.

9. The assembly of claim 6, wherein the end cover includes a strengthening ring that is received at least partially within the impeller portion adjacent the portion of the outer wall secured to the outward portion.

10. The housing of claim 6, wherein the radially extending flange supports a plurality of connecting members that facilitate connecting the end cover to the driveline components.

11. The housing of claim 6, wherein the driveline component comprises a flywheel.

* * * * *